United States Patent [19]

Shinohara

[11] Patent Number: 4,511,939
[45] Date of Patent: Apr. 16, 1985

[54] CASSETTE TAPE RECORDER

[75] Inventor: Isao Shinohara, Hirakata, Japan

[73] Assignee: Matsushita Electric Industrial Co., Ltd., Osaka, Japan

[21] Appl. No.: 398,214

[22] Filed: Jul. 14, 1982

[30] Foreign Application Priority Data

Jul. 17, 1981 [JP] Japan ............................ 56-112480
Jul. 17, 1981 [JP] Japan ............................ 56-112481
Jul. 17, 1981 [JP] Japan ............................ 56-112482

[51] Int. Cl.³ ............................................ G11B 15/00
[52] U.S. Cl. ...................................... 360/93; 360/105
[58] Field of Search .................. 360/93, 90, 69-70, 360/74.1, 96.1-96.4, 105

[56] References Cited

U.S. PATENT DOCUMENTS 4,305,103 12/1981 Osanai ............................ 360/93 X
4,412,638 11/1983 Tomabechi ...................... 360/105 X Primary Examiner—John H. Wolff
Attorney, Agent, or Firm—Birch, Stewart, Kolasch & Birch

[57] ABSTRACT

The disclosure is directed to an improved cassette tape recorder which is arranged to have a small loss during the change-over in the running or travelling directions of a magnetic tape between a first direction, i.e. a forward direction, and a second direction, i.e. a reverse direction, and wherein only a small functioning stroke is required for actuating the magnetic heads.

4 Claims, 15 Drawing Figures

CASSETTE TAPE RECORDER

BACKGROUND OF THE INVENTION

The present invention generally relates to a magnetic tape recording and reproducing apparatus and more particularly, to a cassette tape recorder capable of effecting reverse reproduction, i.e. reproduction of one side and the other side of a magnetic tape cassette without the necessity for turning over the tape cassette, and particularly the, employing a magnetic type cassette of a miniature type having first and second tape pads and first and second capstan holes formed at the outer opposite sides of said tape pads.

Conventionally, in a magnetic tape recording and reproducing apparatus or tape recorder capable of effecting reverse reproduction and having first and second capstans, it has been the general practice to change over the running or travelling direction of the magnetic tape in such a manner that a first pinch roller for running the magnetic tape in a first direction is brought into pressure contact with a first capstan, while a second pinch roller for running the magnetic tape in a second direction is brought into pressure contact with a second capstan, with pressure contact by the first and second pinch rollers with respect to the magnetic tape being alternately effected according to the change-over in the running direction of the tape.

The known arrangement as described above, however, has the disadvantages in that, although the second or first pinch roller not concerned with the tape running function during the running in the first or second direction is spaced from the second or first capstan, a pressure contact load is normally applied so as to be received at all times by an actuating means for actuating said first and second pinch rollers from a stationary state to a tape running state. More specifically, a load which is the sum of the pressure contact loads for the first and second pinch rollers is always applied to said actuating means during the tape running state, with a large driving force and a retaining force being required therefor, and accordingly, not only is a large operating force needed, but also high power is required if a driving means such as a solenoid or the like is employed as a consequence, the size of the apparatus is increased, thus presenting a considerable hindrance in the manufacture of a miniature tape recorder employing a miniature tape cassette and further demands in size reduction.

Meanwhile, in a tape recorder utilizing an ordinary or compact tape cassette somewhat larger in size than the miniature tape cassette, and capable of effecting a reverse reproduction, it is so arranged that the tape pad is provided at a central portion between two reel hubs, and consequently, there is provided only one magnetic head arranged to be applied both to the first tape running direction and the second tape running direction. The conventional arrangement as described above has such problems that, since it is difficult to bring the magnetic tape into exactly the same running state in the first running direction and in the second running direction, there may be a case where, if an azimuth of the magnetic head is adjusted during the running in the first direction, the azimuth of the magnetic head is undesirably deviated during the running in the second direction.

However, in the miniature tape cassette, since two tape pads, i.e. the first and second tape pads are provided, if first and second magnetic heads are provided to correspond to said first and second pads so as to use the first magnetic head during running in the first direction, and to utilize the second magnetic head during running in the second direction, the magnetic heads may be arranged to function at an optimum azimuth for both of the running directions. In the above case, however, there is the inconvenience that, if both the first and second magnetic heads are adapted to sufficiently contact the magnetic tape to a "deep" degree, the running load for the tape is undesirably increased, thus requiring a large force for driving the magnetic tape, with a resulting increase in the rotating load for the driving motor and an increase in power consumption.

Moreover, in the miniature tape recorder, for the stabilization of the running of the magnetic tape and also, for stabilization in contact between the magnetic heads and the magnetic tape, it is arranged to apply a back tension, and in the conventional arrangement, the application of such a back tension is effected by imparting a rotating load to a supply side reel base. However, the known practice as described above also gives rise to a load during fast forwarding and rewinding of the magnetic tape, thus requiring a large torque, with an increase in power consumption. Furthermore, when a tape position detecting function is effected by causing the magnetic tape to run at high speed, with the first and second magnetic heads contacting the magnetic tape, from the running state of the magnetic tape in the first and second directions as described earlier, the tape running load is still large, even if said first and second magnetic heads are arranged to slightly contact the magnetic tape by a "shallow" degree, also resulting in such drawbacks as a required large torque, increased power consumption of the driving motor, and a short life of the magnetic heads, etc.

SUMMARY OF THE INVENTION

Accordingly, an essential object of the present invention is to provide an improved cassette tape recorder which has a small loss during change-over of running directions of the magnetic tape between a first direction and a second direction, and wherein only a small functioning stroke is required for actuating means of the magnetic heads.

Another important object of the present invention is to provide an improved cassette tape recorder as described above which is simple in construction and stable in functioning at high reliability, and can be readily manufactured on a large scale at low cost.

In accomplishing these and other objects, according to one preferred embodiment of the present invention, there is provided a cassette tape recorder for use with a magnetic tape cassette accommodating a magnetic tape therein and having first and second tape pads, and first and a second capstan holes located in opposite sides of said first and second tape pads. The cassette tape recorder includes first and a second capstans to be inserted into the first and second capstan holes, first and second pinch rollers for running the magnetic tape of the cassette selectively in first (forward) and second (reverse) directions, in association with the first and second capstans, change-over means for changing over the functioning of said first and second pinch rollers, and first and second magnetic head base plates for mounting thereon first and second magnetic heads corresponding to the first and second tape pads. The first and second magnetic head base plates and the changeover means are associated with each other through a first actuating means having a pivotal point in a position approximately intermediate between the first and second capstans for see-saw movement so that the first magnetic head is arranged to contact the magnetic tape sufficiently to a "deep" degree, with the second magnetic head located at an upstream side with respect to the first magnetic head being adapted to contact the magnetic tape slightly to a "shallow" degree during the first running function of the magnetic tape, and wherein the second magnetic head is arranged to contact said magnetic tape sufficiently to a "deep" degree, with the first magnetic head located at an upstream side with respect to said second magnetic head being adapted to contact the magnetic tape slightly to a "shallow" degree during the second running function of the magnetic tape.

By the arrangement according to the present invention as described above, an improved cassette tape recorder efficient in operation and stable in functioning at high reliability has been advantageously presented, with substantial elimination of disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
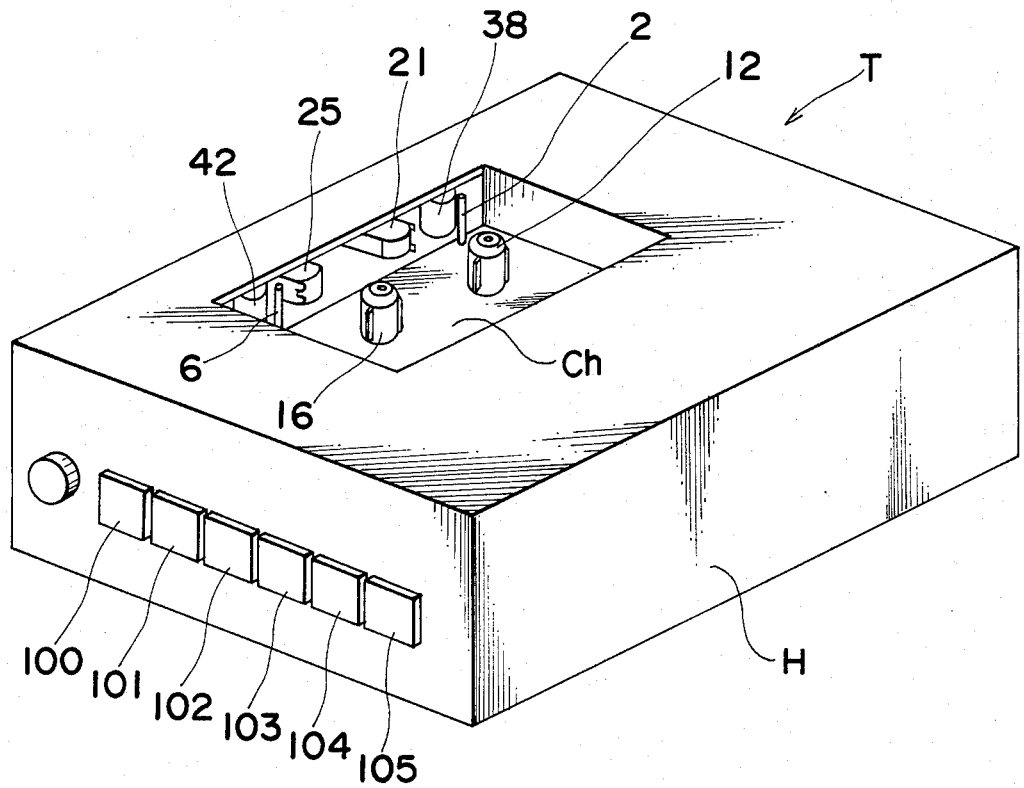
FIG. 1 is a perspective view of a cassette tape recorder to which the present invention may be applied.

Before the description of the present invention proceeds, it is to be noted that like parts are designated by like reference numerals throughout the accompanying drawings.

Referring now to the drawings, there is shown, in FIGS. 3 through 14, a cassette tape recorder T according to one preferred embodiment of the present invention. The cassette tape recorder T which may be normally accommodated in a housing or casing H as shown in FIG. 1, and employs a miniature or micro tape cassette M (referred to as a tape cassette hereinbelow) as illustrated in FIG. 2, generally includes chassis 1, first and a second magnetic heads 21 and 25, first and second pinch rollers 38 and 42, first and second capstans 2 and 6, and first and a second reel bases 12 and 16 rotatably mounted on corresponding spindles 13 and 17, all of which are disposed in a cassette chamber Ch (FIG. 1) formed in the housing H for engagement with the magnetic tape cassette M to be received therein.

Figure 2:
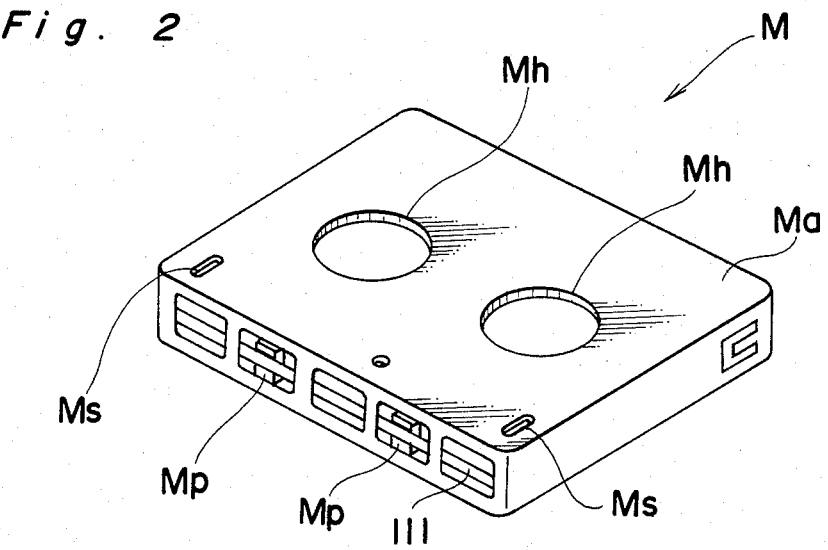
FIG. 2 is a perspective view of a miniature cassette type magnetic tape or tape cassette to be employed for the tape recorder of FIG. 1.

Meanwhile, the magnetic tape cassette M as shown in FIG. 2 includes a casing Ma, and reel hubs Mh for engagement with the first and second reel bases 12 and 16 and capstan holes Ms for engagement with the first and second capstans 2 and 6, which are formed in the casing Ma, and first and second tape pads Mp for the magnetic tape 111 (FIG. 15) accommodated in the casing Ma in a known manner.

Figure 4:
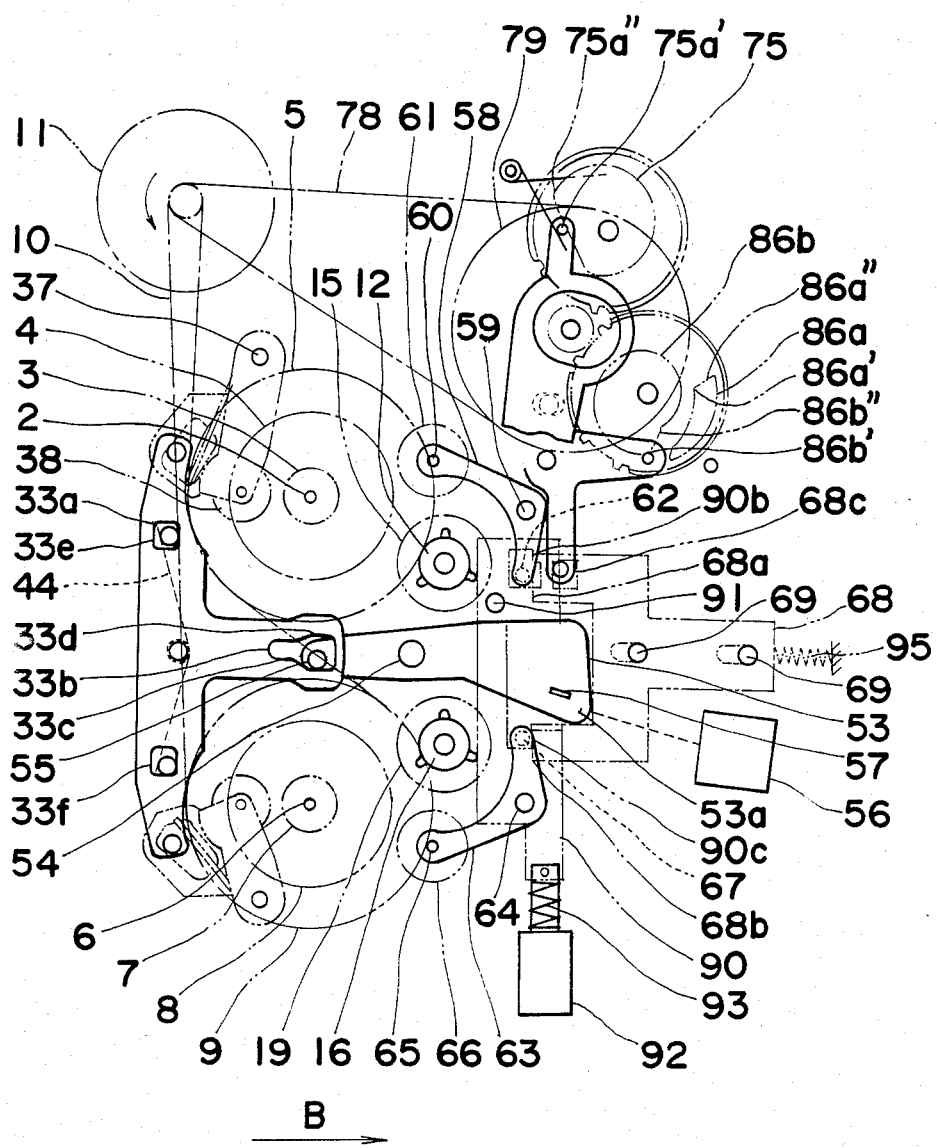
FIG. 4 is a view similar to FIG. 3, which particularly shows only a driving section of the arrangement of FIG. 3 in a stationary state, with a chassis thereof removed for clarity.

Referring particularly to FIGS. 4 through 14, the first capstan 2 has a first small gear 3, a first large gear 4 and a first fly wheel 5 concentrically provided therewith as one unit, while the second capstan 6 has a second small gear 7, a second large gear 8 and a second fly wheel 9 also concentrically provided therewith so as to be one unit (FIG. 4).

The first and second fly wheels 5 and 9 are transmitted with a counterclockwise rotation of a motor 11 through a belt 10, so that the first fly wheel 5 is rotated in the clockwise direction, while the second fly wheel 9 is rotated in the counterclockwise direction.

Figure 3:
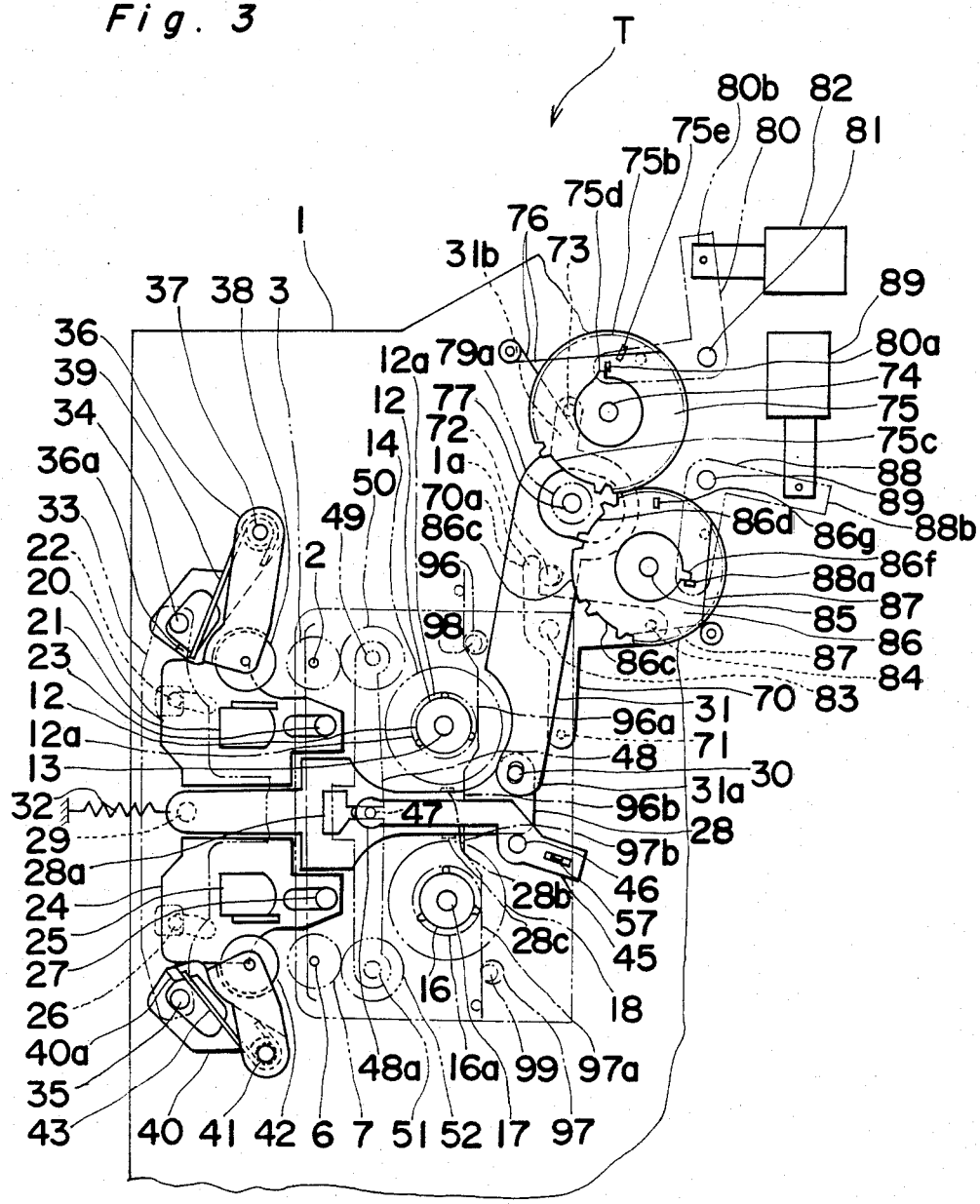
FIG. 3 is a top plan view of a cassette tape recorder in a stationary state according to one preferred embodiment of the present invention, with a housing thereof removed for clarity.

The first reel base 12 rotatably mounted on the spindle 13 has a first large reel gear 14, and a first small reel gear 15, while the second reel base 16 rotatably mounted on the spindle 17 is provided with a second large reel gear 18 and a second small reel gear 19 (FIGS. 3 and 4).

The first and second large reel gears 14 and 18 are equipped with a slip mechanism (not shown), through which rotation is transmitted to the first and second reel bases 12 and 16 in a known manner, and the detailed description thereof is abbreviated here for brevity.

A first magnetic head base plate 20 on which the first magnetic head 21 is mounted, has a pin 22 and is slidably provided through a pin 23 of the chassis 1 and an elongated opening (not shown) is formed in the chassis 1 for guiding said pin 22. Similarly, a second magnetic head base plate 24 mounted thereon with the second magnetic head 25 has a pin 26 and is slidably provided through another pin 27 of said chassis 1 and another elongated opening (not shown) formed in the chassis 1 for guiding said pin 26.

In a position between the first and second reel bases 12 and 16, there is provided a driving rod 28 having, at its one end, a pin 29 slidably engaged with an elongated opening (not shown) of the chassis 1, and at the other end thereof, a pin 30 is connected to one end 31a of a power lever 31, with the entire driving rod 28 being urged by a spring 32 in a direction indicated by an arrow A.

A tape running direction control lever 33 of a generally T-shape is pivotally connected to the pin 29 at one end of the driving rod 28 referred to above, and has pins 34 and 35 provided at its opposite ends, an elongated opening 33b with tapered faces 33c and 33d, formed in an end of a central portion thereof, and holes 33e and 33f formed in positions adjacent to the pins 34 and 35 for insertion thereinto the pins 22 and 26 of the first and second magnetic head base plates 20 and 24 mentioned earlier.

Meanwhile, a first pinch roller lever 36 pivotally mounted on a pin 37 is provided with the first pinch roller 38 and a pressure spring 39, and engaged with the pin 34 of the direction control lever 33, while a second pinch roller lever 40 pivotally mounted on a pin 41 has the second pinch roller 42 and a pressure spring 43, and is engaged with the pin 35 of the direction control lever 33.

A spring 44 is provided on the pin 29 at the end of the driving rod 28 described earlier so as to urge the pins 22 and 26 of the magnetic head base plates 20 and 24 in the direction indicated by an arrow B.

A winding up or take-up lever 45 pivotally mounted on a pin 46 has, at its one end, a pin 47 which is engaged with a control opening 28a formed in the driving rod 28.

On the other hand, a winding up or take-up gear lever 48 has a first take-up gear 50 rotatably mounted on a pin 49 provided at one end of the lever 48, and a second take-up gear 52 also rotatably mounted on another pin 51 provided at the other end of said lever 48, with an elongated opening 48a formed at the central portion of the lever 48 being engaged with the pin 47 provided at one end of the take-up lever 45 described earlier.

A change-over lever 53 pivotally mounted on a pin 54 has, at its one end, a pin 55 engaged with the elongated opening 33b formed at the end of the central portion of the direction control lever 33 so as to contact the tapered faces 33c and 33d of said opening 33b, while the other end 53a of the change-over lever 53 is connected to a change-over means 56. (FIG. 4).

There is further provided a plate spring 57 which is engaged with an opening 45a formed at the other end of the take-up lever 45. Since the change-over means 56 may be of any known construction, detailed description thereof is abbreviated here for brevity.

A first fast forward lever 58 pivotally mounted on a pin 59 has a first fast forward gear 61 rotatably mounted on a pin 60 provided at one end of the lever 58, and a pin 62 provided at the other end of said lever 58, and is urged counterclockwise by a spring (not shown), while a second fast forward lever 63 pivotally supported by a pin 64 has a second fast forward gear 66 rotatably mounted on a pin 65 provided at one end of the lever 63, and a pin 67 provided at the other end thereof, and is urged clockwise by a spring (not shown).

Meanwhile, a fast forward rod 68 slidably mounted on a pin 69 has U-shaped end portions 68a and 68b urged in the direction of the arrow B by a spring 95 and arranged to contact the pin 62 at the other end of the first fast forward lever 58 and the pin 67 at the other end of the second fast forward lever 63, with an elongated opening 68c thereof being connected to a pin 71 provided at one end of a fast forward driving lever 70.

The power lever 31 as described above has a pin 72 which is slidably engaged with an elongated opening 1a of the chassis 1, while a pin 73 provided at the other end 31b of the lever 31 is held in pressure contact with a cam 75a of a first driving pulley 75 rotatably mounted on a pin 74 of said chassis 1. The first driving pulley 75 has a gear portion 75b, a teeth lacking portion 75c and a first and a second engaging portions 75d and 75e (FIG. 3).

The above gear portion 75b is arranged to be engaged with a driving gear 79a of a power pulley 79 rotatably mounted on a pin 77 so as to be rotated counterclockwise by the motor 11 through a belt 78.

On the other hand, a first lock lever 80 pivotally mounted on a pin 81 is urged counterclockwise by a spring 76, while a projection 80a at one end of the lever 80 is arranged to be engageable with the first and second engaging portions 75d and 75e of the first driving pulley 75 with the other end 80b being connected to a reproducing solenoid 82.

The fast forward driving lever 70 as described above pivotally mounted on a pin 83, has its other end 70a contacting the pin 72 of the power lever 31 mentioned earlier, while a pin 84 provided at an end of the central portion is arranged to contact a first and a second cams 86a and 86b of a second driving pulley 86 rotatably mounted on a pin 85 of the chassis 1 so as to be held in pressure contact with the second cam 86b by a spring 87. The second driving pulley 86 described above has a gear portion 86c, a first and a second teeth lacking portions 86d and 86e, and a first and a second engaging portions 86f and 86g, and the gear portion 86c is arranged to be engaged with the driving gear 79a of the power pulley 79.

A second lock lever 88 pivotally mounted on a pin 89 is urged clockwise by the spring 87, while a projection 88a at one end of the lever 88 is arranged to be engageable with the first and second engaging portions 86f and 86g of the second driving pulley 86, with the other end 88b being connected to a fast forward solenoid 89.

Meanwhile, a change-over rod 90 slidably supported by a pin 91 has its one end connected to a change-over solenoid 92 and is urged in the direction indicated by an arrow C (FIG. 5) by a spring 93. A first and a second stepped portions 90b and 90c of said change-over rod 90 are respectively arranged to contact pins 62 and 67 provided at the other ends of said first and second fast forward levers 58 and 63.

A first and second back tension springs 96 and 97 provided on pins 98 and 99 of the chassis 1 have their central portions 96a and 97a at the functioning side arranged to contact outer peripheral portions 12a and 16a (FIG. 5) of said first and second reel bases 12 and 16, with the forward ends 96b and 97b thereof being arranged to contact folded portions 28b and 28c of the driving rod 28.

By the above arrangement, functionings of the cassette tape recorder T according to the present invention will be described hereinbelow.

In the first place, description will be given on a first constant speed tape running function.

Under the stationary or shut-down state as shown in FIGS. 3 and 4, with the change-over lever 53 being located by the change-over means at the position as indicated in FIG. 4, upon energization of the reproducing solenoid 82, the first lock lever 80 is rotated clockwise against the urging force of the spring 76, and thus, the engagement between the first engaging portion 75d of the first driving pulley 75 and the projection 80a at one end of the first lock lever 80 is released. In the above case, since the first driving pulley 75 is urged, from the state in which the teeth lacking portion 75c is located at the driving gear 79a, in the clockwise direction for rotation through biasing by the spring 76 towards the pin 73 at the other end of the power lever 31, the gear portion 75b of the first driving pulley 75 is engaged with the driving gear 79a for rotating the first driving pulley 75 in the clockwise direction.

Upon rotation of the first driving pulley 75 in the clockwise direction as described above, the power lever 31 is rotated counterclockwise about the pin 72 contacting the other end 70a of the fast forward driving lever 70 by the cam 75a, and thus, the driving rod 28 is slid in the direction of the arrow B against the urging force of the spring 32.

Figure 5:
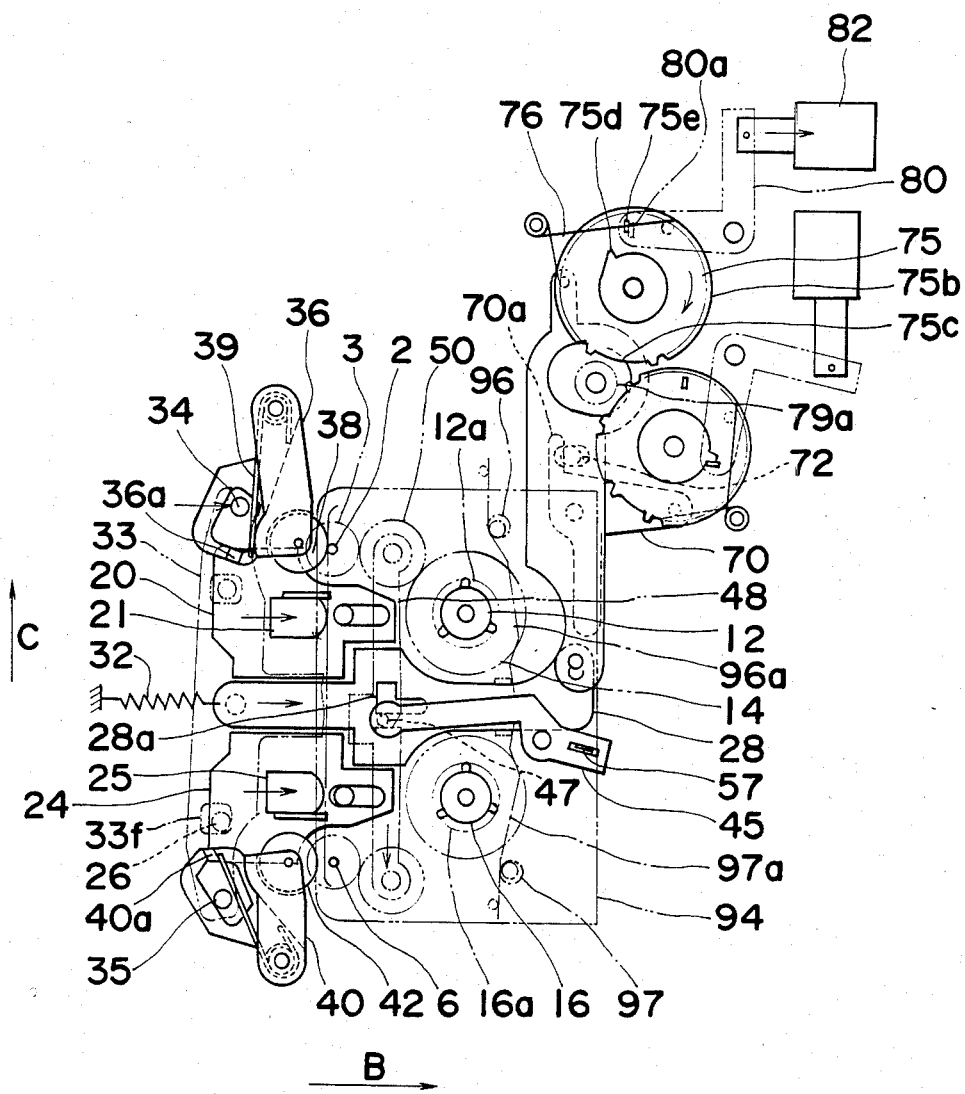
FIG. 5 is a view similar to FIG. 3, which particularly shows the arrangement in a reproducing state in the first direction (forward direction), with a driving motor rotating.

Furthermore, upon rotation of the first driving pulley 75 in the clockwise direction, the engagement between the driving gear 79a and the gear portion 75b is released through the teeth lacking portion 75c, and simultaneously, the pin 73 at the other end of the power lever 31 is located at the second tapered portion 75a'' of said cam 75a, with the pin 73 being urged by the spring 76, while the power lever 31 is further urged clockwise by the spring 32 of the driving rod 28 so as to bias the first driving pulley 75 in the clockwise direction, but, since the projection 80a at one end of the first lock lever 80 stops the second engaging portion 75e of the first driving pulley 75, the arrangement is held under the state as shown in FIG. 5.

Upon sliding movement of the driving rod 28 in the direction of the arrow B, the take-up lever 45 becomes pivotable through control by the opening 28a of the driving rod 28, so as to be urged counterclockwise by the plate spring 57 of the change-over lever 53 for rotation as in FIG. 5.

When the take-up lever 45 is rotated as shown in FIG. 5, the take-up gear lever 48 which is engaged with the pin 47 at one end of the take-up lever 45, is shifted as in FIG. 5, and the first take-up gear 50 engages the first small gear 3 and the first large reel gear 14 so that the rotation of said first small gear 3 in the clockwise direction is transmitted to the first large reel gear 14, i.e. to the first reel base 12.

Simultaneously, upon movement of the driving rod 28 in the direction of the arrow B, the direction control lever 33 is also moved in the same direction.

Figure 6:
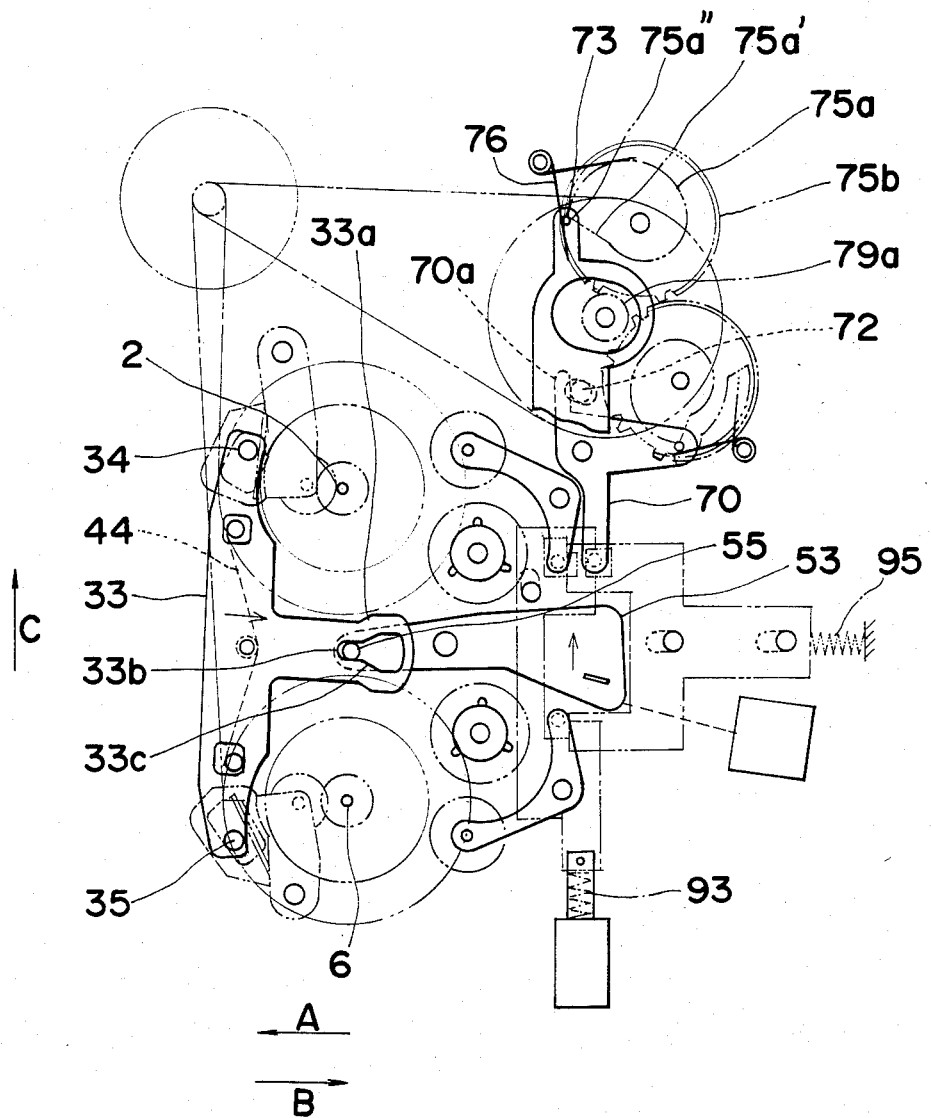
FIG. 6 is a top plan view similar to FIG. 4, which shows the same state as in FIG. 5.

Upon movement of the direction control lever 33 in the direction of the arrow B, the elongated groove 33b formed at the end 33a of the central portion of the lever 33 is engaged with the pin 55 provided at one end of the change-over lever 53 through the tapered face 33c so as to be brought into a state of a clockwise rotation to a certain extent as shown in FIG. 6.

When the direction control lever 33 is brought into the state as shown in FIG. 6, the pressure spring 39 of the pinch roller lever 36 is actuated by the pin 34, and the first pinch roller 38 is brought into pressure contact with the first capstan 2, and causes a magnetic tape (not shown) accommodated in a tape cassette 94 and connected at its opposite ends respectively to a reel hub (not shown) engaged with the first reel base 12 and another reel hub (not shown) engaged with the second reel base 16, to run in a first direction (i.e. the direction indicated by the arrow C). Moreover, the first magnetic head base plate 20 is slid in the direction of the arrow B by the spring 44 so as to be in the state shown in FIG. 5, with the first magnetic head 21 being "deeply" (i.e. by a deep degree) contacting the magnetic tape for effecting the reproducing function. In the above case, the second magnetic head base plate 24 is similarly slid in the direction of the arrow B, and for achieving a stable running of the magnetic tape by causing the second magnetic head 25 to slightly contact the magnetic tape by a "shallow" degree through control of the pin 26 via the opening 33f of the direction control lever 33, a back tension is applied. Meanwhile, the second pinch roller lever 40 is arranged to space the second pinch roller 42 from the second capstan 6 by the pin 35 of the direction control lever 33 for effecting the first constant speed tape running function.

In the above case, the forward ends 96b and 97b at the functioning side of the first and second back tension springs 96 and 97 are shifted by the folded portions 28b and 28c of the driving rod 28 towards the right side as shown in FIG. 5, with the central portions 96a and 97a thereof being spaced from the outer peripheries 12a and 16a of the first and second reel bases 12 and 16 so as not to apply rotational load to said reel bases 12 and 16.

Subsequently, a second constant speed tape running functioning will be described hereinbelow.

Figure 7:
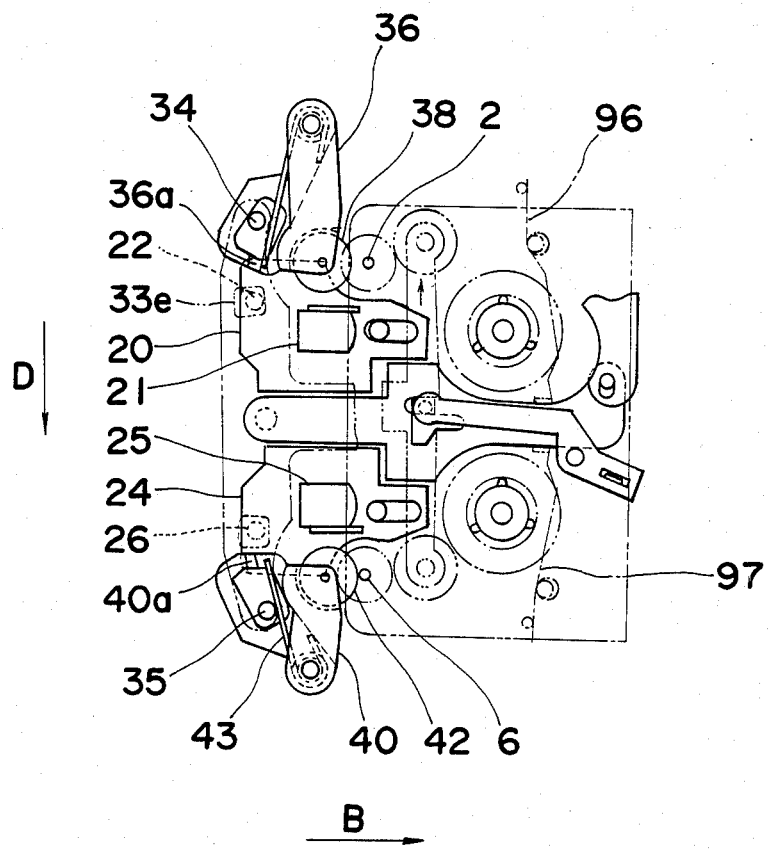
FIG. 7 is a view similar to FIG. 5, which particularly shows the arrangement in a reproduction state, in a second direction (reverse direction), with the solenoid arrangement in FIG. 5 removed for clarity.
Figure 8:
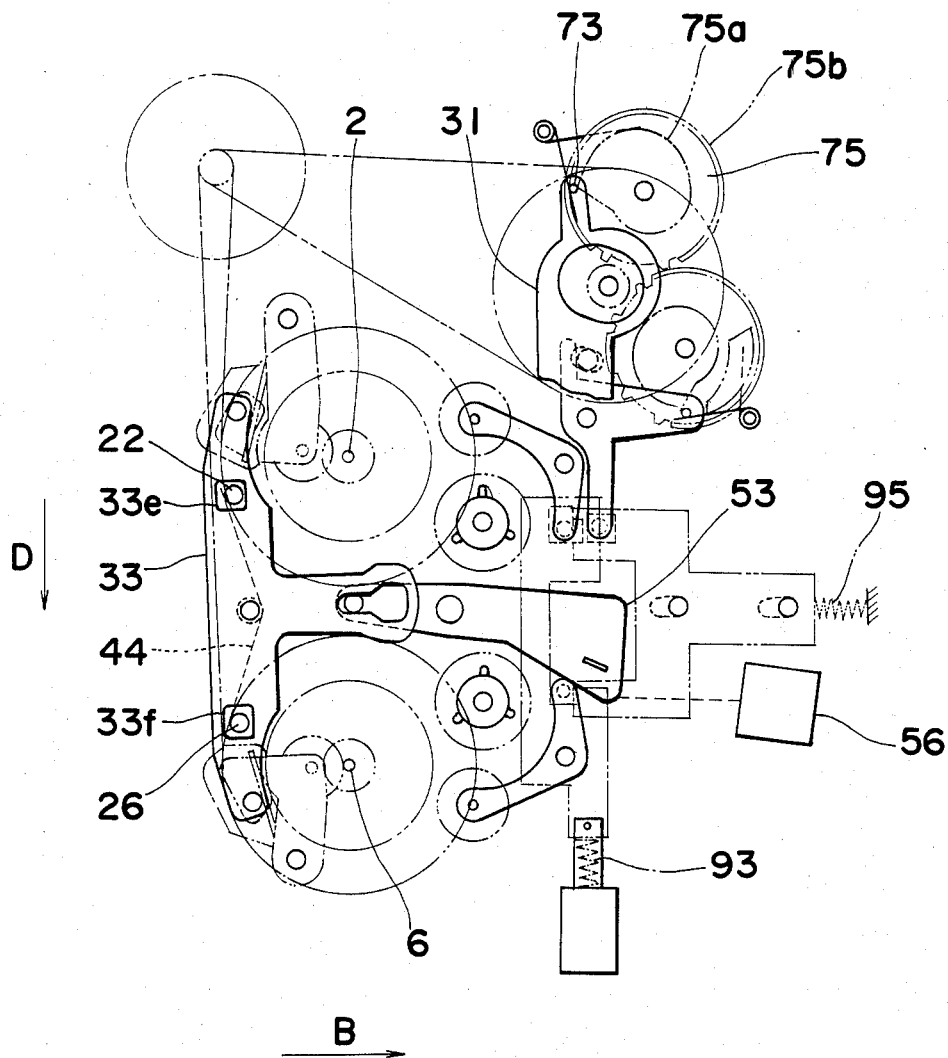
FIG. 8 is a view corresponding to FIG. 7 and equivalent to FIG. 4, which shows the arrangement in a reproduction state in a second direction.

Upon actuation of the change-over means 56 from the first constant speed tape running function as shown in FIGS. 5 and 6, the change-over lever 53 is rotated clockwise so as to be in a state as shown in FIG. 8. When the change-over lever 53 is brought into the state of FIG. 8, the direction control lever 33 is rotated counterclockwise as shown in FIG. 8, and therefore, the first pinch roller lever 36 is rotated clockwise by the pin 34, and as shown in FIG. 7, the first pinch roller 38 is spaced from the first capstan 2, while the second pinch roller lever 40 is actuated by the pressure spring 43 through movement of the pin 35, and thus, the second pinch roller 42 brought into pressure contact with the second capstan 6 causes the magnetic tape to run in the second direction (i.e. in the direction of the arrow D) for effecting the second constant speed tape running function.

In the above case, the first and second back tension springs 96 and 97 are actuated in the similar manner as in the first constant speed tape running function, and the reel bases 12 and 16 are not applied with rotating load.

Simultaneously, the first head base plate 20 has its pin 22 controlled by the opening 33e of the direction control lever 33, and the first magnetic head 21 slightly contacts the magnetic tape by a shallow degree as shown in FIG. 7. Meanwhile, the second magnetic head base plate 24 is brought into the state as shown in FIG. 7 through the pin 26 urged by the spring 44, and the second magnetic head 25 is adapted to contact the magnetic tape by a deep degree for effecting the reproducing function.

On the other hand, in the state where the change-over lever 53 is brought into the state of FIG. 8 by the change-over means 56, with the arrangement being in the stationary state (i.e. the state as shown in FIG. 3), upon actuation of the reproducing solenoid 82, the second constant speed tape running function is effected as shown in FIGS. 7 and 8. Since the functioning for the second constant speed tape running is generally similar to that in the first constant speed tape running described earlier, detailed description thereof is abbreviated here for brevity.

It is to be noted that, in the first constant speed tape running function, the pressure spring 43 for the second pinch roller lever 40, and the pressure spring 39 for the first pinch roller lever 36 are respectively rendered to be non-operative by respective preventing portions 40a and 36a so that no load is applied to the direction control lever 33.

Upon releasing the functioning of the reproduction solenoid 82 from the first and second constant speed tape running functions in FIGS. 5 and 6, and FIGS. 7 and 8, the first lock lever 80 is rotated counterclockwise by the spring 76, and the projection 80a at its one end is spaced from the second engaging portion 75e of the first driving pulley 75. In this case, since the pin 73 at the other end of the power lever 31 contacts the second tapered portion 75a' of the cam 75a, the first driving pulley 75 is rotated clockwise, and owing to the simultaneous engagement of the second engaging portion 75d of the first driving pulley 75 with the projection 80a at one end of the lock lever 80, said first driving pulley 75 is brought into the state shown in FIGS. 3 and 4.

When the first driving pulley 75 is brought into the state as in FIGS. 3 and 4, the power lever 31 and driving rod 28, etc. are also brought into the stationary state as shown in FIGS. 3 and 4. In the above case, the central portions 96a and 97a of the first and second back tension springs 96 and 97 are brought into pressure contact with the outer peripheral portions 12a and 16a of the reel bases 12 and 16 so as to transmit the rotational load to said reel bases 12 and 16. Moreover, since the driving rod 28 is urged in the direction of the arrow A by the spring 32, the direction control lever 33 is also urged in the direction of the arrow A, while simultaneously, the pin 55 at one end of the change-over lever 53 is disengaged from the elongated groove 33b, and tapered faces 33c and 33d. Accordingly, the first and second magnetic head base plates 20 and 24 are positionally restricted by the pins 23 and 27 of the chassis 1, while, at the same time, the direction control lever 33 is also positionally restricted by the pins 22 and 26 of the magnetic head base plates 20 and 24 and the spring 44 as shown in FIGS. 3 and 4, and thus, the first and second magnetic heads 21 and 25 are spaced from the magnetic tape (not particularly shown) by approximately the same distance, with the first and second pinch rollers 38 and 42 being also spaced from the first and second capstans 2 and 6 by approximately the same distance. It is to be noted here that the stationary state in FIGS. 3 and 4 is the state during the constant speed tape running function in the first direction.

Subsequently, description will be given on the first high speed tape running function hereinbelow.

Upon energization of the fast forward solenoid 89 from the stationary state in FIGS. 3 and 4, the second lock lever 88 is rotated counterclockwise against the spring 87, and the first engaging portion 86f of the second driving pulley 86 is released from the engagement with the projection 88a at one end of the second lock lever 88. In the above case, the second driving pulley 86 is urged for rotation in the clockwise direction by the pin 84 provided at the end of the fast forward driving lever 70 so as to be biased through a spring 87 for contact with the first tapered portion 86b' and the second tapered portion 86b" of the second cam 86b, and since the pin 71 at one end of the lever 70 is adapted to be movable within the elongated opening 68c formed in the fast forward rod 68, the second driving pulley 86 is rotated in the clockwise direction, and the driving gear 79a is engaged with the gear portion 86b for rotation into the state where the second teeth lacking portion 86e confronts the driving gear 79a as shown in FIG. 9, while simultaneously, the second engaging portion 86g of the second driving pulley 86 is stopped by the projection 88a at one end of the second lock lever 88, and thus, the fast forward driving lever 70 is rotated counterclockwise by the first cam 86a of the second driving pulley 86, with a consequent sliding movement of the fast forward rod 68 in the direction of the arrow B against the spring 95 as shown in FIG. 9.

Figure 9:
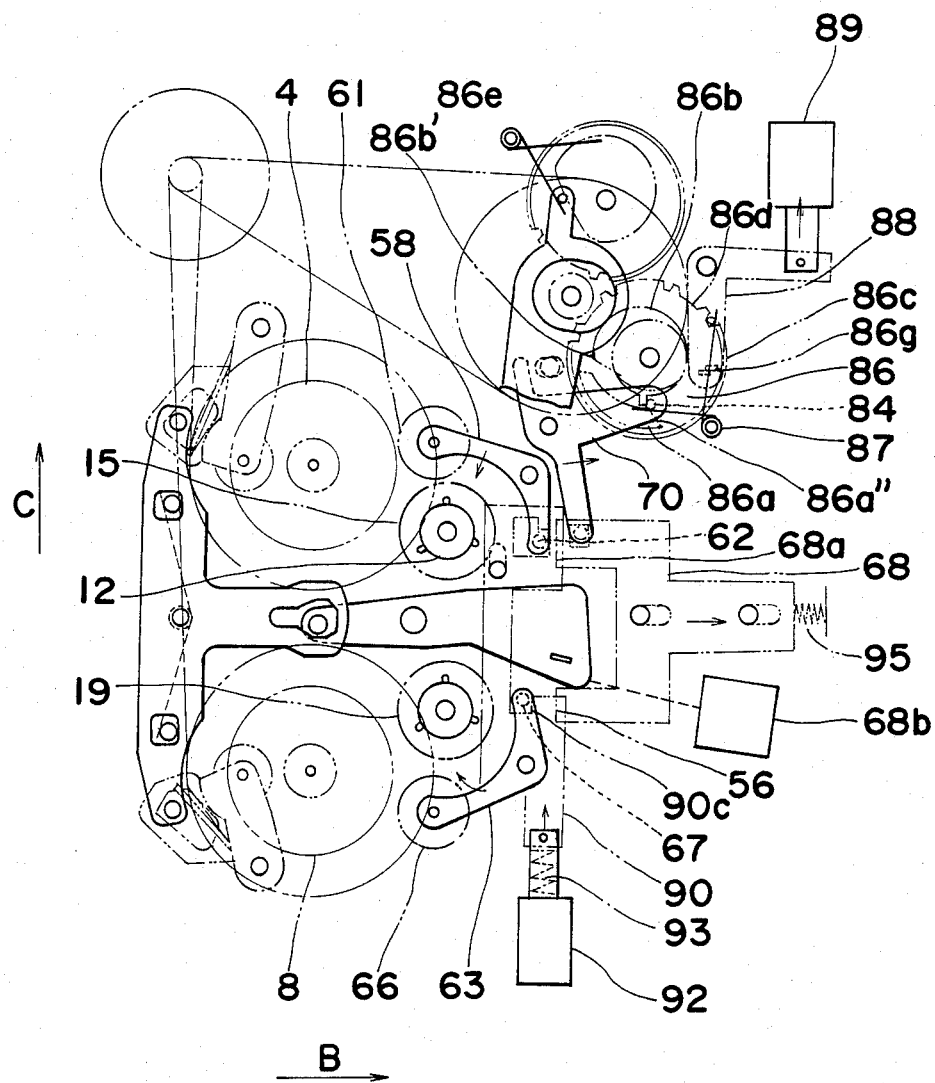
FIG. 9 is view similar to FIG. 4, which particularly shows the arrangement in a fast forward function in a first direction.

When the fast forward rod 68 is slid in the direction of the arrow B against the spring 95 as shown in FIG. 9, the first forward lever 58 is rotated in the counterclockwise direction by a spring (not shown) through releasing of depression of the pin 62 by the U-shaped forward end 68a of fast forward rod 68, and as shown in FIG. 9, the first fast forward gear 61 is engaged with the first large gear 4 and the first small reel gear 15 rotated in the clockwise direction, and thus, the first reel base 12 is rotated in the clockwise direction. In the above case, the second fast forward lever 63 is released from the depression of the pin 67 at its other end, by the U-shaped forward end 68b of the fast forward rod 68, but since it is prevented from being urged for rotation in the clockwise direction by a spring (not shown) for the pin 67 at the other end of the second fast forward lever 63 through the second stepped portion 90c of the change-over rod 90, the second fast forward gear 66 is spaced from the second large gear 8 and the second small reel gear 19 rotated in the counterclockwise direction. Accordingly, the magnetic tape is caused to run at high speed in the first direction (in the direction of the arrow C). In the above case, since a rotational load is applied to the second reel base 16 by the second back tension spring 97, a back tension is imparted to the magnetic tape.

Subsequently, a second high speed tape running function will be explained hereinbelow.

Figure 10:
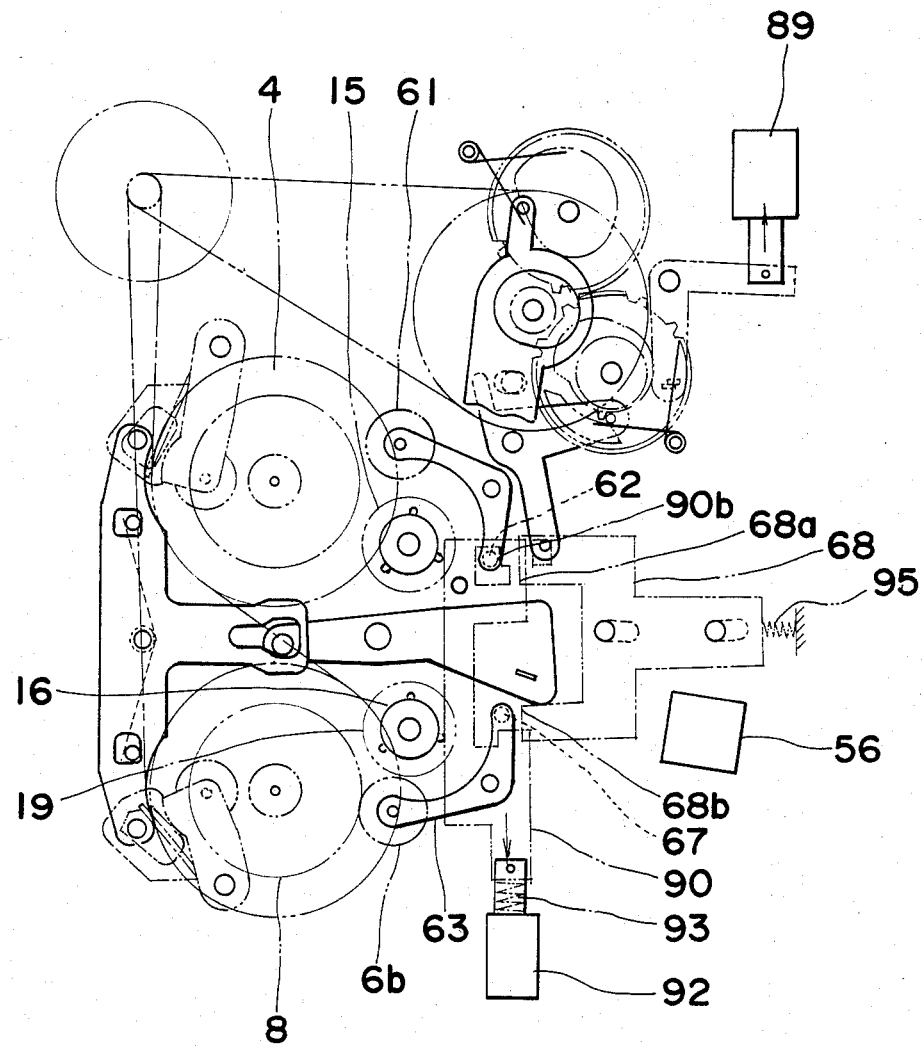
FIG. 10 is a view similar to FIG. 9, which particularly shows the arrangement under a rewinding state in a first direction.

Under the stationary condition of FIGS. 3 and 4, and in the state where the change-over rod 90 is slid as in FIG. 10 through actuation of the change-over solenoid 92, upon actuation of the fast forward solenoid 89, the fast forward rod 68 is slid in the direction of the arrow B against the spring 95 as shown in FIG. 10 in the similar manner as in the first high speed tape running function.

When the fast forward rod 68 is slid in the direction of the arrow B against the spring 95 as shown in FIG. 9, the second fast forward lever 63 is rotated clockwise by a spring (not shown) through releasing of depression of the pin 67 by the U-shaped forward end portion 68b of the fast forward rod 68, and as shown in FIG. 10, the second fast forward gear 66 is engaged with the second large gear 8 and the second small reel gear 19 rotated in the counterclockwise direction, and thus, the second reel base 16 is rotated in the counterclockwise direction.

In the above case, although the first forward lever 58 is released from the depression of the pin 62 at its other end by the U-shaped end 68a of the fast forward rod 68, since it is prevented from being rotated counterclockwise by the urging of a spring (not shown), via the first stepped portion 90b of the change-over rod 90, the first forward gear 61 is spaced from the first large gear 4 and the first small reel gear 15. Accordingly, the magnetic tape (not shown) is caused to run at high speed in the second direction (in the direction indicated by the arrow D).

In the above state, since a rotational load is imparted to the first reel base 12 by the first back tension spring 96, a back tension is applied to the magnetic tape.

Upon releasing functioning of the fast forward solenoid 89 from the first and second high speed tape running states in FIGS. 9 and 10, the second lock lever 88 is rotated clockwise by the spring 87, and the projection 88a at its one end is spaced from the second engaging portion 86g of the second driving pulley 86. In this case, since the pin 84 at the central end portion of the fast forward lever 70 is held in pressure contact with 15 the first and second tapered portions 86a' and 86a'' through urging of the fast forward rod 68 in the direction of the arrow A by the spring 95, the second driving pulley 86 is rotated in the clockwise direction, and thus, the gear portion 86c of the second driving pulley 86 is engaged with the driving gear 79a, with the second driving pulley 86 being rotated clockwise.

Upon rotation of the second driving pulley 86 in the clockwise direction, the fast forward driving lever 70 is rotated clockwise by the second cam 86b of the second drive pulley 86.

When the second driving pulley 86 is further rotated clockwise, the engagement between the driving gear 79a and the gear portion 86c is released by the teeth lacking portion 86d, while simultaneously, since the pin 84 at the end of the central portion of the fast forward driving lever 70 is located at the first tapered portion 86b' of the second cam 86b, with the pin 84 being urged by the spring 87, the second driving pulley 86 is urged clockwise, but, owing to the fact that the projection 88a at one end of the second lock lever 88 stops the engaging portion 86f of the second driving pulley 86, the state as shown in FIGS. 3 and 4 is maintained.

Upon rotation of the fast forward driving lever 70 in the clockwise direction into the state shown in FIGS. 3 and 4, from the state shown in FIGS. 9 and 10, the fast forward rod 68 is slid by the spring 95 as in FIG. 4, and the U-shaped end portions 68a and 68b thereof depress the pins 62 and 67 at the other ends of the first and second fast forward levers 58 and 63 to establish the stationary state as in FIG. 4.

Subsequently, the position detecting function for the magnetic tape will be described hereinbelow. In the first place, the position detecting function in the first constant speed tape running state will be described below.

Upon actuation of the fast forward solenoid 89 from the first constant speed tape running state in FIGS. 5 and 6, the magnetic tape is caused to travel at high speed in the first direction in the similar manner as in the first high speed tape running function. Simultaneously, as shown in FIG. 11, since the fast forward driving lever 70 is rotated counterclockwise, holding of the pin 72 of the power lever 31 is also released, and the power lever 31 is rotated clockwise about the pin 73 at the other end, but is restricted in its position by the elongated opening 1a of the chassis 1 to be held in the state of FIG. 11.

Figure 11:
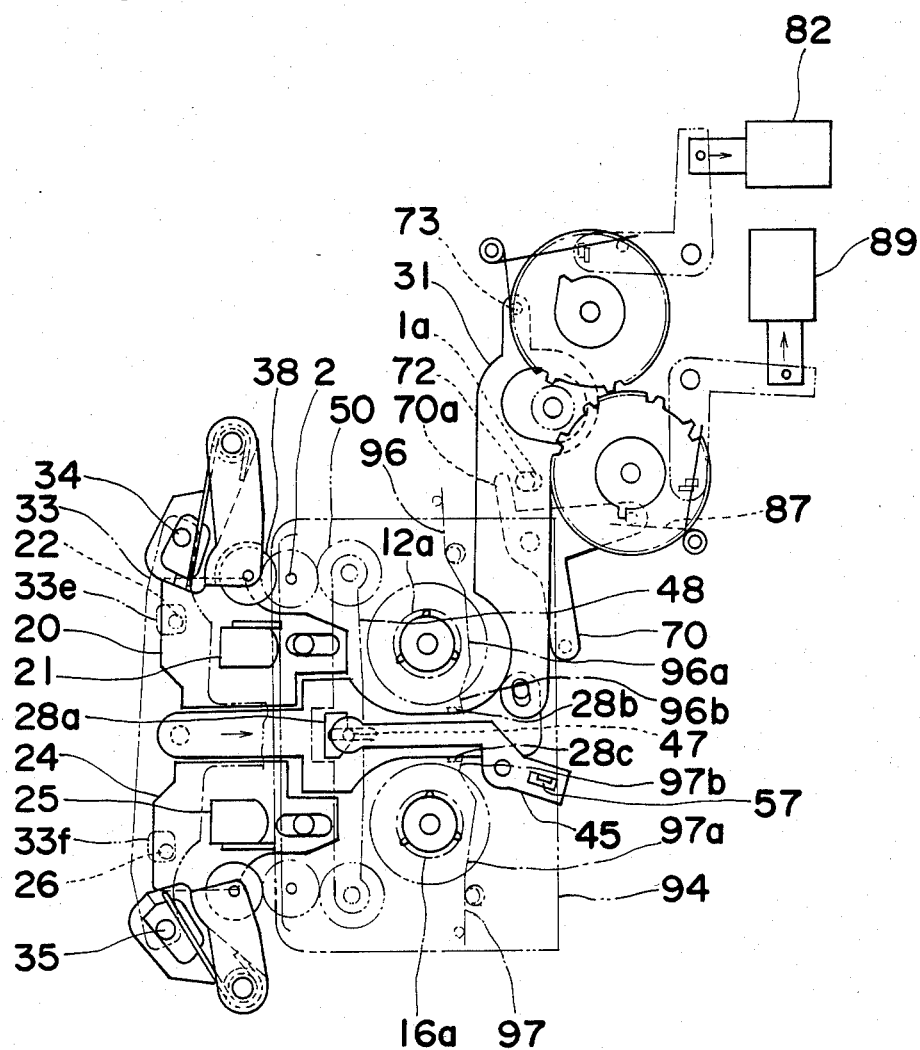
FIG. 11 is a view similar to FIG. 8, which particularly shows the arrangement in a high speed running in a first direction for music selection, i.e. detection of unrecorded blanks between recorded portions on the magnetic tape.
Figure 12:
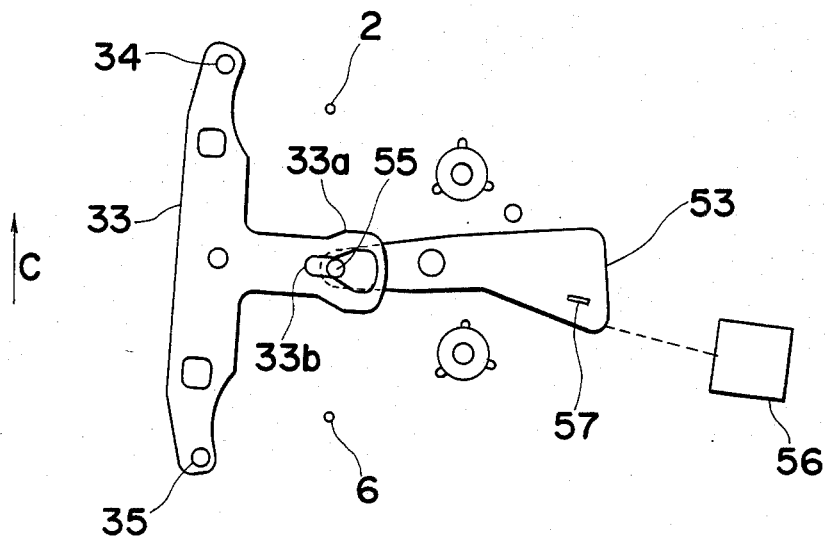
FIG. 12 is a fragmentary diagram explanatory of a function of a tape running direction control level in FIG. 8.
Figure 14:
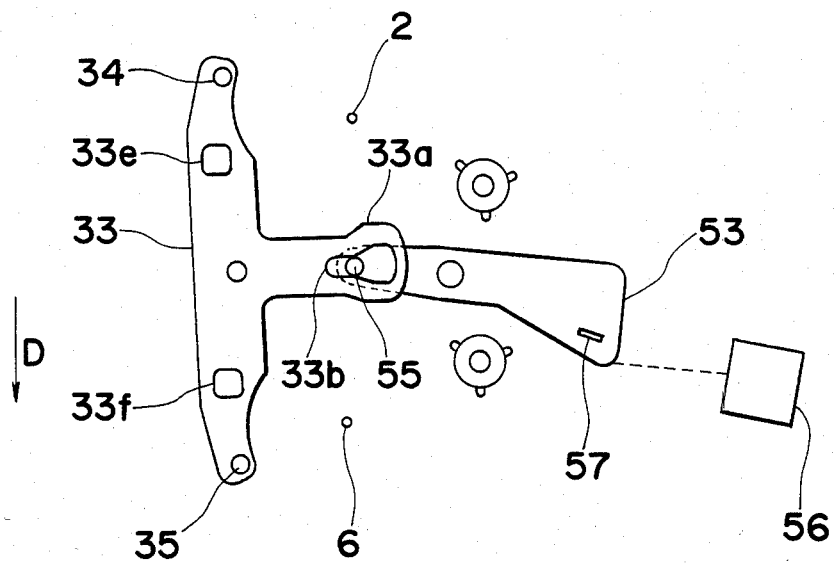
FIG. 14 is a diagram similar to FIG. 12, which particularly shows the direction control lever in a different position.

When the power lever 31 is brought into the state as shown in FIG. 11, the driving rod 28 and the direction control lever 33 are also slightly slid in the direction of the arrow A from the state of FIG. 5 into the state shown in FIG. 11, and the take-up lever 45 is brought into the neutral position by the engagement of the pin 47 at its one end with the opening 28a of the driving rod 28, while the take-up gear lever 48 is also held in the neutral position as shown in FIG. 11 so as to be released from the transmission of rotation to the first reel base 12.

Simultaneously, the first and second magnetic head base plates 20 and 24 are also slid through the openings 33e and 33f of the direction control lever 33 in the direction of the arrow A as shown in FIG. 11. In this case, since the elongated groove 33b in the end 33a of the central portion of the direction control lever 33 remains engaged with the pin 55 at one end of the change-over lever 53, the first megnatic head 21 contacts the magnetic tape slightly by a shallow degree, and the second magnetic head 25 is held in a spaced state.

Moreover, the first pinch roller 38 is also spaced from the first capstan 2 by the pin 34 of the direction control lever 33, and the position detecting function in the case where the magnetic tape is caused to travel in the first direction (in the direction indicated by the arrow C) under the first constant speed tape running state, is effected.

The position detecting function in the case of high speed tape running in the second direction (in the direction of the arrow D) may be achieved by effecting the second high speed tape running function from the first constant tape running function.

Hereinbelow, the position detecting function in the second constant speed tape running function will be explained.

When the change-over solenoid 92 is actuated from the second constant speed tape running function in FIGS. 7 and 8, and the fast forward solenoid 89 is further actuated, the magnetic tape is caused to run at high speed in the second direction (in the direction of the arrow D) in the similar manner as in the second high speed tape running function. Simultaneously, since the fast forward driving lever 70 is rotated counterclockwise as shown in FIG. 13, the pin 72 of the power lever 31 is also released from holding, and the power lever 31 is rotated clockwise about the pin 73 at the other end, but, due to the positional restriction by the elongated opening 1a of the chassis 1, is held in the state as shown in FIG. 13.

Figure 13:
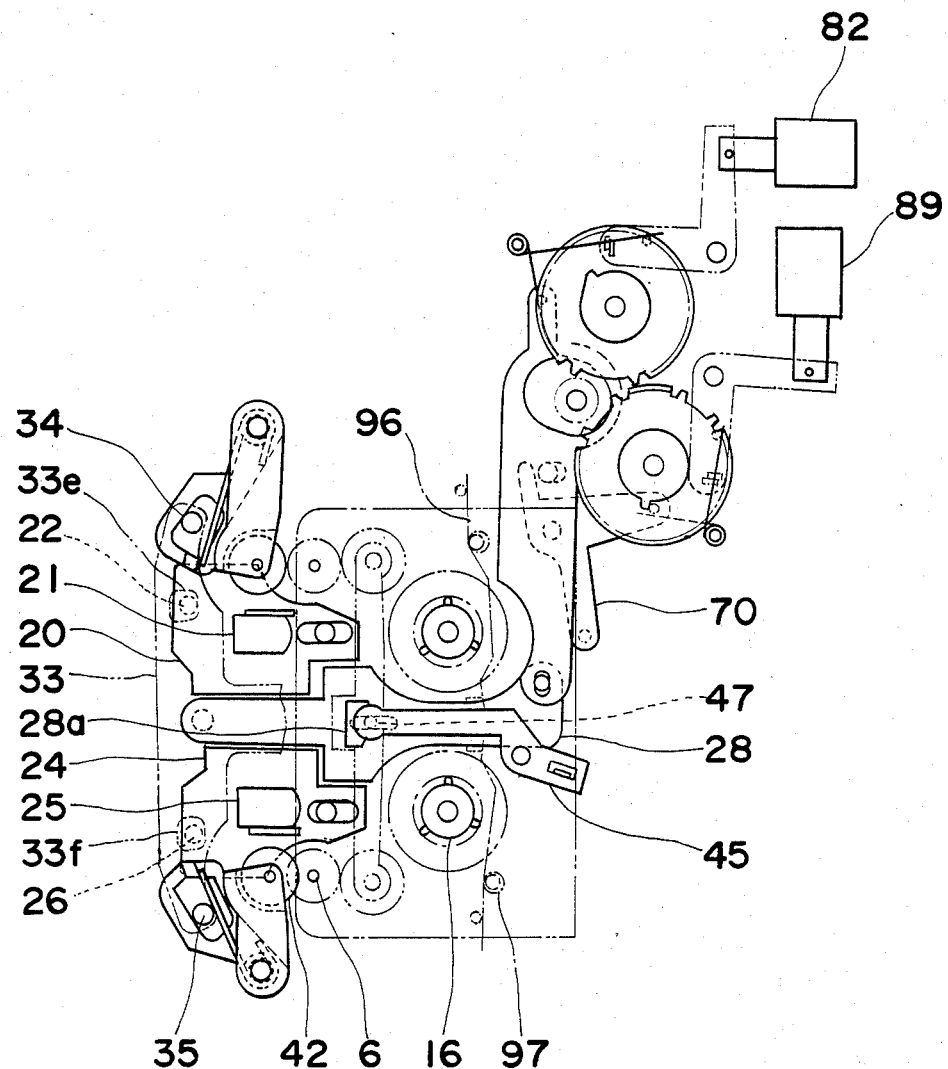
FIG. 13 is a view similar to FIG. 11, which particularly shows the state for detection of the unrecorded blanks between recorded portions during running of the tape in a second direction.

When the power lever 31 is brought into the state as in FIG. 13, the driving rod 28 and the direction control lever 33 are similarly slightly slid in the direction of the arrow A from the state in FIG. 7 into the state of FIG. 13, and the take-up lever 45 is brought into the neutral position through engagement of the pin 47 at its one end with the hole 28a of the driving rod 28, while the take-up gear lever 48 is also brought into the neutral position as shown in FIG. 13, so that the transmission of rotation to the second reel base 16 is interrupted.

At the same time, the first and second magnetic head base plates 20 and 24 are also slid in the direction of the arrow A through the openings 33e and 33f of the direction control lever 33, and in the above case, since the elongated groove 33b formed at the end 33a of the central portion of the direction control lever 33 remains engaged with the pin 55 at one end of the change-over lever 53, the second magnetic head 25 contacts the magnetic tape by a shallow degree, with the first magnetic head 21 being held in a spaced state.

Furthermore, the second pinch roller 42 is also spaced from the second capstan 6 by the pin 35 of the direction control lever 33, and the position detecting at high speed tape running in the second direction (in the direction of the arrow D) under the second constant speed tape running state is effected.

The position detecting function in the case of high speed tape running in the first direction (in the direction of the arrow C) may be achieved by effecting the second high speed tape running function from the the second constant tape running function.

It should be noted here that, even when the position detecting function at the high speed tape running in the first and second directions (in the direction of the arrows C and D) is effected from the first and second constant speed tape running states as described above, the central portions 96a and 97a at the functioning side of the first and second back tension springs 96 and 97 are spaced from the outer peripheral portions 12a and 16a of the first and second reel bases 12 and 16 by the folded portions 28b and 28c of the driving rod 28, and thus, no rotational load is transmitted to the first and second reel bases 12 and 16.

Figure 15:
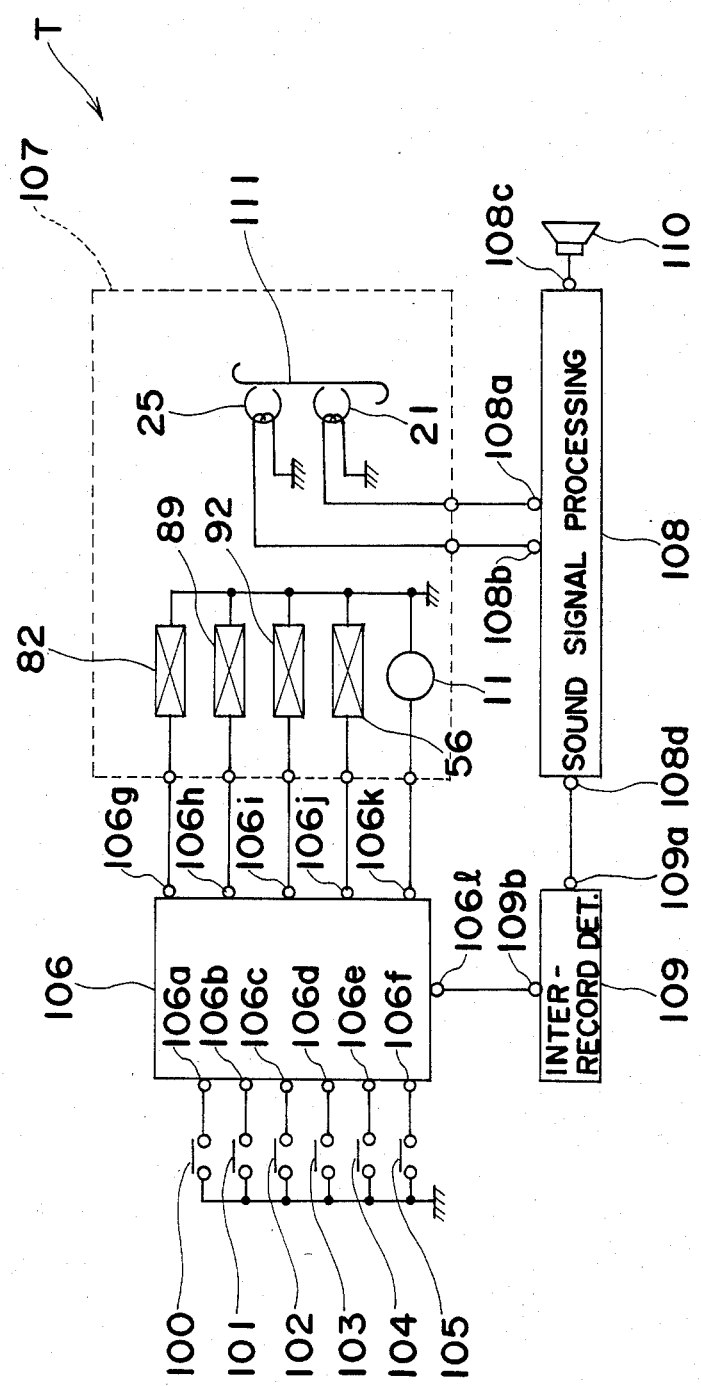
FIG. 15 is a block diagram showing the circuit construction of the cassette tape recorder of FIG. 3.

Referring now to FIG. 15, there is shown a block diagram for an electrical section for controlling the mechanisms of the cassette tape recorder according to the present invention as described so far.

The circuit arrangement in FIG. 15 generally includes a control section 106 for mainly controlling functionings of the mechanism section 107 of the tape recorder as described in the foregoing and surrounded by dotted lines in FIG. 15, an inter-recording detection section or music selector, i.e. a detecting section which automatically locates the unrecorded blanks between the recorded portions on the tape, and a voice or sound signal processing section 108 coupled to the inter-recording section 109 and also to the first and second magnetic heads 21 and 25 of the mechanism section 107.

More specifically, input terminals 106a, 106b, 106c, 106d, 106e and 106f of the control section 106 are respectively connected to a fast forward switch 100 for the first high speed tape running function, a shut-down switch 101, a rewind switch 102 for the second high speed tape running function, a reproduction operating switch 103, an inter-recording detecting switch 104, and a forward and reverse tape running change-over switch 105 so as to read-in the inputs from these switches. An input terminal 106l of the control section 106 is connected to an output terminal 109b of the inter-recording detecting section 109 so as to receive the output signal developed from said terminal 109b. On the other hands, output terminals 106g, 106h, 106i, 106j and 106k of the control section 106 are respectively connected to the reproducing slenoid 82, fast forward solenoid 89, change-over solenoid 92, changeover means 56, and motor 11. Meanwhile, outputs from the first magnetic head 21 and the second magnetic head 25 for deriving signals from a magnetic tape 111 are respectively connected to input terminals 108a and 108b of the sound signal processing section 108. The sound signal processing section 108 has a function as a change-over circuit for selecting the magnetic head 21 or 25 according to the running direction of the magnetic tape 111, and a functioning to amplify the signal outputs from the magnetic heads 21 and 25 for producing sound from a speaker 110 connected to an output terminal 108c of said section 108. Moreover, from an output terminal 108d of the sound processing section 108, signal detected from the magnetic tape 111 is applied to an input terminal 109a of the inter-recording detecting section 109. More specifically, the inter-recording detecting section 109 has a function to detect the absence for a predetermined period of time, of the signal being applied to the input terminal 109a thereof in the inter-recording detecting function described later, for developing pulses from its output terminal 109b. Furthermore, although not particularly shown, power is applied to the control section 106, sound signal processing section 108, and inter-recording detecting section 109 through a power switch, and in the state where the power switch is turned on, the motor 11 is applied with the power for function at all times.

Subsequently, functioning of the circuit will be described hereinbelow with reference to FIG. 15.

In the first place, for effecting the first constant speed tape running function, when the reproduction operating switch 103 is turned on, voltage is applied to the reproducing solenoid 82 by the control section 106 to bring the solenoid 82 in an state of attraction. In the above state, upon turning on of the direction control operating switch, the change-over means 56 functions for a predetermined period of time so as to transfer the tape running into the second constant speed running function. When the direction control operating switch is further turned on, the change-over means 56 functions again so as to make it possible to return the tape running back to the first constant speed running function. In the above first and second constant speed tape running states, the output signals from the magnetic heads 21 and 25 are respectively amplified at the signal processing section 108 to produce sound from the speaker 110. Moreover, in the above first and second constant speed tape running states, upon turning on of the shut-down switch 101, the reproducing solenoid 82 is released from the attraction so as to stop the running of the magnetic tape 111. In the above case, only the motor 11 is rotating and the output signals from the magnetic heads 21 and 25 are not produced from the speaker 110.

Subsequently, for effecting the first high speed tape running function, the fast forward operating switch 100 is turned on. Upon turning on of said switch 100, voltage is impressed to the fast forward solenoid 89 by the control section 106, and accordingly, the solenoid 89 is attracted to establish the first high speed tape running state. When the rewind switch 102 is turned on in the above state, the fast forward solenoid 89 is once released from attraction by the control section 106 to stop the tape running, and thereafter, the change-over solenoid 92 is first attracted automatically, and after lapse of a predetermined period of time, the fast forwarding solenoid 89 is attracted for transfer into the second high speed tape running function. However, the control section 106 functions so that the change-over solenoid 92 stops its attraction after the attraction of the fast forward solenoid 89. Furthermore, in the first and second high speed tape running states, upon turning on of the shut-down switch 101, attractions of all the solenoids are suspended, and the magnetic tape is brought into the stationary state.

Hereinbelow, functions for the inter-recording detection will be described.

In the high speed tape running function, upon turning of the inter-recording detecting switch 104, the reproducing solenoid 82 is attracted in addition to the fast forward solenoid 89, and the inter-recording detecting function in the first high speed tape running function is started. In the above state, the magnetic head 21 detects the signal of the magnetic tape 111 so as to apply said signal to the sound signal processing section 108, from which said signal is input to the inter-recording detecting section 109. Under the above condition, upon arrival of an unrecorded blank between the recorded portions on the magnetic tape, at the magnetic head 21, level of the signal to be applied from the signal processing section 108 to the inter-recording detecting section 109 is reduced to a large extent and therefore, the inter-recording detecting section 109 develops the inter-recording detecting pulses from its output terminal 109b. The pulses thus produced are applied to the control section 106, which suspends the attraction of the fast forward solenoid 89 through detection of the input of said pulses. Accordingly, only the reproducing solenoid 82 functions, with the mechanism 107 being transferred into the first constant speed tape running function. It is to be noted that the inter-recording detection may similarly be effected from the second high speed function.

As is clear from the foregoing description, according to the cassette tape recorder of the present invention, since the load only at one side of the pressure contact loads for the two pinch rollers is applied during running of the magnetic tape, only small driving force and retaining force are required for the first actuating means, with a consequent reduction of power for the driving means which drives said first actuating means, while owing to the see-saw or alternate functioning of the second actuating means, loss in the change-over is very small.

Moreover, owing to the arrangement for applying the back tension without imparting the rotational load to the reel bases, etc., less load is required for the motor during fast forwarding, etc., while the running of the magnetic tape, and the contact of the magnetic heads for effecting the reproduction with respect to the magnetic tape are stabilized.

Furthermore, since the first and second magnetic heads are adapted to be controlled by the first actuating means, the construction of the arrangement has been simplified. In addition, even if the stroke of the first actuating means is smaller than in the case where the first and second pinch rollers and magnetic heads are moved in parallel relation approximately as they are, said first and second pinch rollers and magnetic heads are sufficiently spaced from the first and second capstans and magnetic tape, and thus, tape cassette may be exchanged without any inconvenience, with simultaneous reduction of the size of the apparatus.

As described in the foregoing, according to the cassette tape recorder of the present invention, only small torque is required for the motor during the constant speed tape running, high speed tape running, and also tape position detection, and therefore, power consumption is reduced, with a prolonged service life of the magnetic heads.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A cassette tape recorder for use with a magnetic tape cassette accommodating a magnetic tape therein and having first and second tape pads, and first and second capstan holes located in opposite sides of said first and second tape pads, said cassette tape recorder comprising first and second capstans adapted to be inserted into said first and second capstan holes, first and second pinch rollers for selectively running the magnetic tape of said cassette in a first and second direction in association with said first and second capstans, a change-over means for changing over the functioning of said first and second pinch rollers, and a first and second magnetic head base plate having mounted therein a first and second magnetic head corresponding to said first and second tape pads, said first and second magnetic head base plates and said change-over means being associated with each other through a first actuating means having a pivotal point in a position approximately intermediate said first and second capstans for see-saw movement so that said first magnetic head is arranged to provide sufficient contact with said magnetic tape to achieve a reproducing state, with said second magnetic head located at an upstream position with respect to said first magnetic head being adapted to provide minimum, non-reproducing contact of the magnetic tape during the first running function of said magnetic tape, and said second magnetic head being arranged to provide sufficient contact with said magnetic tape to achieve a reproducing state, with said first magnetic head located at an upstream side with respect to said second magnetic head being adapted to provide a minimum, non-reproducing contact with the magnetic tape during the second running function of said magnetic tape.

2. The cassette tape recorder as claimed in claim 1, further including a second actuating means for selectively bringing said first and second magnetic heads into positions for contacting or being spaced apart from said magnetic tape through control of said first and second magnetic head base plates, said first actuating means which has its pivotal point in the position approximately intermediate said first and second capstans of said second actuating means for see-saw movement, being arranged to be associated, at one end thereof, with a first pressure means, for bringing said first pinch roller into pressure contact with said first capstan, and at the other end thereof, with a second pressure means for bringing said second pinch roller into pressure contact with said second capstan so that said first actuating means is subjected to the see-saw movement by said change-over means, said change-over means being arranged to change-over said first actuating means between a first tape running function in which said first pressure means is actuated to bring said first pinch roller into pressure contact with said first capstan, while said second pinch roller is spaced apart from said second capstan, with said second pressure means being rendered non-operative in a position where said second actuating means has caused at least said first magnetic head to sufficiently contact the magnetic tape by a deep degree, and a second tape running function in which said second pressure means is actuated to bring said second pinch roller into pressure contact with said second capstan, while said first pinch roller is spaced from said first capstan, with said first pressure means being rendered non-operative in a position where said second actuating means has caused at least said second magnetic head to provide sufficient contact with the magnetic tape to achieve a reproducing state.

3. The cassette tape recorder as claimed in claim 2, wherein said first actuating means is rendered to be nonassociated with said change-over means in a position where said second actuating means has caused said first and second magnetic heads to be spaced from the magnetic tape, said first and second pinch rollers being arranged to be spaced from said first and second capstan by approximately the same distance, and said first and second magnetic heads being also spaced from the magnetic tape by approximately the same distance.

4. A cassette tape recorder for use with a magnetic tape cassette accommodating a magnetic tape therein and having first and second tape pads, and first and second capstan holes located in opposite sides of said first and second tape pads, said cassette tape recorder comprising first and second capstans adapted to be inserted into said first and second capstan holes, first and second constant speed running means for selectively running the magnetic tape accommodated in said cassette in a first and a second direction in association with said first and second capstans, a change-over means for changing over the functioning of said first and second constant speed running means, a first and second magnetic head base plate having mounted thereon a first and second magnetic head corresponding to said first and second tape pads, and an actuating means which moves said first and second magnetic head base plates for displacing the magnetic heads into a position where said magnetic heads contact the magnetic tape, and into another position where said magnetic heads are spaced apart from the magnetic tape, said change-over means being associated with said actuating means so as to control said actuating means in such a manner that one of said first or second magnetic heads is brought into non-reproducing contact with the magnetic tape from said first or second constant speed tape running state, whereas the other of said second or first magnetic heads is arranged to be spaced apart from the magnetic tape when the magnetic tape is caused to run at a high speed when operating in a magnetic tape position detecting function.

* * * * *